United States Patent
Demoulin et al.

(10) Patent No.: US 11,033,872 B2
(45) Date of Patent: Jun. 15, 2021

(54) METHOD FOR PREPARING CAPSULES WITH IMPROVED RETENTION PROPERTIES AND CAPSULES OBTAINED THEREFROM

(71) Applicant: CALYXIA, Bonneuil-sur-Marne (FR)

(72) Inventors: Damien Demoulin, Paris (FR); Alicia Sadaoui, Maisons Alfort (FR); Jamie Walters, Paris (FR)

(73) Assignee: CALYXIA, Bonneuil-sur Marne (FR)

( * ) Notice: Subject to any disclaimer, the term of this patent is extended or adjusted under 35 U.S.C. 154(b) by 0 days.

(21) Appl. No.: 16/495,955

(22) PCT Filed: Mar. 21, 2018

(86) PCT No.: PCT/EP2018/057214
§ 371 (c)(1),
(2) Date: Sep. 20, 2019

(87) PCT Pub. No.: WO2018/172431
PCT Pub. Date: Sep. 27, 2018

(65) Prior Publication Data
US 2020/0129948 A1    Apr. 30, 2020

(30) Foreign Application Priority Data

Mar. 21, 2017  (FR) ..................... 1752334

(51) Int. Cl.
*B01J 13/18* (2006.01)
*C08F 2/22* (2006.01)
*C08F 2/48* (2006.01)

(52) U.S. Cl.
CPC .......... *B01J 13/18* (2013.01); *C08F 2/22* (2013.01); *C08F 2/48* (2013.01)

(58) Field of Classification Search
None
See application file for complete search history.

(56) References Cited

U.S. PATENT DOCUMENTS

| | | | |
|---|---|---|---|
| 2008/0233201 A1 | 9/2008 | Royere et al. | |
| 2009/0099024 A1* | 4/2009 | Casana Giner | B01J 13/16 504/301 |
| 2009/0289216 A1 | 11/2009 | Jung et al. | |
| 2012/0076843 A1* | 3/2012 | Jung | C09B 67/0097 424/401 |
| 2018/0008948 A1* | 1/2018 | Walters | B01J 13/16 |

FOREIGN PATENT DOCUMENTS

| | | |
|---|---|---|
| EP | 2497809 A1 | 9/2012 |
| EP | 3144059 A1 | 3/2017 |
| FR | 2867075 A1 | 9/2005 |
| FR | 3031914 A1 | 7/2016 |
| JP | 2014-200711 A | 10/2014 |

OTHER PUBLICATIONS

International Search Report and Written Opinion for PCT Application No. PCT/EP2018/057214 dated Jun. 5, 2018.
Database WPI, Week 201471, Oct. 27, 2014, Thomson Scientific, London, GB, AN 2014-T68988, XP002775525.

* cited by examiner

*Primary Examiner* — Jeffrey D Washville
(74) *Attorney, Agent, or Firm* — Troutman Pepper Hamilton Sanders LLP

(57) ABSTRACT

The present invention relates to a capsule preparation method for preparing solid microcapsules, comprising the following steps:
a) addition, under agitation, a composition C1, comprising at least one active ingredient, to a polymeric composition C2, the compositions C1 and C2 being mutually immiscible, whereby an emulsion (E1) is obtained comprising droplets of the composition C1 dispersed in the composition C2;
b) addition, under agitation, the emulsion (E1) to a composition C3, the compositions C2 and C3 being mutually immiscible, whereby a double emulsion (E2) is obtained comprising droplets dispersed in the composition C3;
c) applying shear to the emulsion (E2), whereby a double emulsion (E3) is obtained comprising size controlled droplets dispersed in the composition C3; and
d) polymerising the composition C2, whereby solid microcapsules dispersed in the composition C3 are obtained.

11 Claims, No Drawings

METHOD FOR PREPARING CAPSULES WITH IMPROVED RETENTION PROPERTIES AND CAPSULES OBTAINED THEREFROM

CROSS-REFERENCE TO RELATED APPLICATIONS

This is a U.S. national phase application under 35 U.S.C. § 371 of International Patent Application No. PCT/EP2018/057214, filed Mar. 21, 2018, and claims benefit of priority to French Patent Application No. 1752334, filed Mar. 21, 2017. The entire contents of these applications are hereby incorporated by reference.

FIELD OF THE INVENTION

The object of the present invention relates to a method for preparing capsules with improved retention properties. The invention also relates to the capsules as obtained as well as the compositions containing the capsules.

BACKGROUND

A number of compounds, known as active ingredients, are added to formulated products in order to confer them with interesting beneficial application properties or to improve the performance thereof.

However, in many cases, these substances react negatively with other components of the formulated product, which leads to adverse consequences on stability as well as a decline in performance levels.

The encapsulation of active ingredients represents a technique of great beneficial interest for overcoming the limitations related to performance or stability of the formulated products that contain them while also obtaining the advantageous effects derived from the active ingredients at the time of using the formulated product.

In order to completely isolate the active ingredients from the medium that contains them, it is however necessary to confer the capsules with suitable retention properties to enable retaining the active ingredients for periods of up to several years.

A very large number of capsules have been developed in order to isolate active ingredients in formulated products. These capsules are the results obtained from manufacturing methods such as spray-drying, interfacial polymerisation, interfacial precipitation, or solvent evaporation among many others.

The retention properties of these capsules often prove to be limited, which in the short term results in the leaking or release of the active ingredients to the exterior of the capsules.

There is therefore a technical need for improvement in the retention properties of the capsules present in the formulated products.

BRIEF SUMMARY OF THE INVENTION

The present invention therefore serves the object of providing a method for encapsulating active ingredients while preventing the aforementioned problems of leakage of the said active ingredients.

The present invention also serves the object of providing capsules containing at least one active ingredient and having excellent retention properties.

DETAILED DESCRIPTION

Thus, the present invention relates to a method for preparing solid microcapsules, the said solid microcapsules comprising in particular a core containing at least one active ingredient and a solid enveloping shell that completely encapsulates at its periphery the said core, the said solid enveloping shell comprising pores that are less than 1 nm in size;

said method comprising the following steps:

a) the addition, under agitation, of a composition C1, comprising at least one active ingredient, in a polymeric composition C2, the compositions C1 and C2 being immiscible with each other;

the composition C2 comprising at least one monomer or polymer having an average molecular weight of less than 5000 g.mol$^{-1}$, at least one crosslinking agent having an average molecular weight of less than 5000 g.mol$^{-1}$, and optionally at least one photoinitiator having an average molecular weight of less than 5000 g.mol$^{-1}$ or a crosslinking catalyst having an average molecular weight of less than 5000 g.mol$^{-1}$;

the viscosity of the composition C2 being comprised between 500 mPa·s and 100,000 mPa·s at 25° C., and preferably being greater than the viscosity of the composition C1;

whereby an emulsion (E1) is obtained comprising droplets of the composition C1 dispersed in the composition C2;

b) the addition, under agitation, of the emulsion (E1) in a composition C3, the compositions C2 and C3 being immiscible with each other;

the viscosity of the composition C3 being comprised between 500 mPa·s and 100,000 mPa·s at 25° C., and preferably being greater than the viscosity of the emulsion (E1);

whereby a double emulsion (E2) is obtained comprising droplets dispersed in the composition C3;

c) the application of a shear to the emulsion (E2), whereby a double emulsion (E3) is obtained comprising size controlled droplets dispersed in the composition C3; and d) the polymerisation of the composition C2, whereby solid microcapsules dispersed in the composition C3 are obtained.

The method of the invention therefore makes it possible to prepare solid microcapsules comprising a core and a solid enveloping shell that completely encapsulates at its periphery the core, in which the core is a composition C1 comprising at least one active ingredient.

Preferably, the solid microcapsules obtained by the method of the invention are formed of a core containing at least one active ingredient (composition C1) and a solid enveloping shell (obtained from the composition C2) completely encapsulating at its periphery the said core, the said solid enveloping shell comprising pores that are less than 1 nm in size.

The capsules thus obtained by this method have excellent retention capabilities.

This level of performance is achieved thanks to the material of the enveloping shell of the capsules, the pore size of which is preferably less than 1 nm, such that the diffusion of any compound having a molecular size greater than 1 nm is considerably slowed down if not completely stopped.

This result is obtained by ensuring control one or more parameters as described here below, such as the ratio of the material of core/enveloping shell of the capsules (ratio C1/C2 here below), the concentration of crosslinking agent in the material, the number of reactive ends per monomer or polymer/oligomer, the length of the monomers or polymers/oligomers and/or the absence of inert materials in the enveloping shell material such as non-reactive polymers or oligomers or solvents.

The method of the invention additionally also presents the advantage of not requiring the use of surfactants or emulsifiers which could accelerate the release of active ingredients to the exterior of the capsule rendering it uncontrollable; and/or react with the components of the formulated product in which the capsules are intended to be incorporated.

The method of the invention consists in producing a double emulsion composed of droplets containing at least one active ingredient, enveloped in a crosslinkable liquid phase. These double droplets are then rendered monodisperse in size before being converted by means of crosslinking or polymerisation into rigid capsules. The preparation involves 4 steps as described in greater detail here below.

Step a)

The step a) of the method according to the invention consists in preparing a first emulsion (E1).

The first emulsion consists of a dispersion of droplets of the composition C1 (containing at least one active ingredient) in a polymeric composition C2 that is immiscible with C1, created by addition dropwise of C1 to C2 under agitation.

During step a), a composition C1 is added to a crosslinkable polymeric composition C2, this step being carried out under agitation, which means that the composition C2 is agitated, typically in a mechanical manner, while the composition C1 is added, and this in order to emulsify the mixture of the compositions C1 and C2.

The addition of the composition C1 into the composition C2 is typically carried out drop by drop.

During the step a), the composition C1 is at a temperature of between 0° C. and 100° C., preferably between 10° C. and 80° C., and preferably between 15° C. and 60° C. During the step a), the composition C2 is at a temperature of between 0° C. and 100° C., preferably between 10° C. and 80° C., and preferably between 15° C. and 60° C.

Under the conditions of addition in step a), the compositions C1 and C2 are not miscible with each other, which signifies that the amount (by weight) of the composition C1 capable of being solubilised in the composition C2 is less than or equal to 5%, preferably less than 1%, and preferentially less than 0.5%, in relation to the total weight of the composition C2, and that the amount (by weight) of the composition C2 capable of being solubilised in the composition C1 is less than or equal to 5%, preferably less than 1%, and preferentially less than 0.5%, in relation to the total weight of the composition C1.

Thus, when the composition C1 comes into contact with the composition C2 under agitation, the latter is dispersed in the form of droplets, referred to as single droplets.

The immiscibility between the compositions C1 and C2 also provides the ability to prevent the migration of the active ingredient from the composition C1 to the composition C2.

The composition C2 is agitated in a manner so as to form an emulsion comprising of droplets of the composition C1 dispersed in the composition C2. This emulsion is also referred to as "single emulsion" or C1-in-C2 emulsion.

In order to implement the step a), use may be made of any type of agitator usually used to form emulsions, such as, for example, a mechanical agitator with paddles, a static emulsifier, an ultrasonic homogeniser, a membrane homogeniser, a high pressure homogeniser, a colloid mill, a high shear disperser or a high speed homogeniser.

Composition C1

The composition C1 comprises at least one active ingredient A. This composition C1 serves as a carrier for the active ingredient A in the method of the invention, in the droplets formed during the method of the invention and the solid capsules obtained.

According to a first variant of the method of the invention, the composition C1 is monophasic, that is to say it is the pure active ingredient A or indeed a solution comprising the active ingredient A in solubilised form.

According to one embodiment, the active ingredient is solubilised in the composition C1.

According to this variant, the composition C1 typically consists of a solution of the active ingredient A in an aqueous solution, or an organic solvent, or a mixture of organic solvents, the active ingredient A being present based on a mass content ranging from 1% to 99%, in relation to the total mass of the composition C1. The active ingredient A may be present based on a mass content ranging from 5% to 95%, from 10% to 90%, from 20% to 80%, from 30% to 70%, or from 40% to 60%, in relation to the total mass of the composition C1.

According to one embodiment, the composition C1 consists of the active ingredient A.

According to another embodiment of the invention, the composition C1 is a biphasic composition, which signifies that the active ingredient is dispersed, either in liquid form or in solid form, in the composition C1 and is not completely solubilised in the said composition C1.

According to one embodiment, the active ingredient is dispersed in the form of solid particles in the composition C1.

According to this embodiment, the composition C1 may consist of a dispersion of solid particles of the active ingredient in an organic solvent or in a mixture of organic solvents.

According to this embodiment, the composition C1 may consist of a dispersion of solid particles of the active ingredient in an aqueous phase, which comprises of water and optionally hydrophilic organic solvents.

The active ingredient used is, for example:

a crosslinking agent, a hardener, an organic or metal catalyst (such as an organometallic or inorganometallic complex of platinum, palladium, titanium, molybdenum, copper, zinc) used for polymerising polymer-, elastomer-, rubber-, paint-, adhesive-, sealant-, mortar-, varnish-, or coating formulations;

a dye or pigment intended for elastomer-, paint-, coating-, adhesive-, sealant-, mortar-, or paper formulations;

a fragrance (in accordance with the list of molecules established by the International Fragrance Association (IFRA) and available on the website www.ifraorg.org) intended for detersive products such as cleaning/washing products, home care products, cosmetic and personal care products, textiles, paints, coatings;

an aroma/flavouring agent, a vitamin, an amino acid, a protein, a lipid, a probiotic, an antioxidant, a pH corrector, a preservative for food compounds and animal feed;

a softener, a conditioning agent for detersive products, cleaning/washing products, cosmetics and personal care products. In this regard, the active agents that may be used are for example as listed in the US patents U.S. Pat. Nos. 6,335,315 and 5,877,145;

an anti-discolouration or anti-fading agent (such as an ammonium derivative), an antifoaming agent (such as an alcohol ethoxylate, an alkylbenzene sulfonate, a polyethylene ethoxylate, an alkylethoxysulfate or alkylsulfate) intended for detersive products and cleaning/washing products and home care products;

a brightening agent, also referred to as a colour activating agent (such as a stilbene derivative, a coumarin derivative, a pyrazoline derivative, a benzoxazole derivative, or a naphthalimide derivative) intended for detersive products, cleaning/washing products, cosmetics and personal care products;

a biologically active compound such as an enzyme, a vitamin, a protein, a plant extract, an emollient agent, a disinfecting agent, an antibacterial agent, an anti-UV agent, a medicament intended for cosmetic and personal care products, and textiles. Among these biologically active compounds the following may be mentioned: vitamins A, B, C, D and E, para-aminobenzoic acid, alpha hydroxy acids (such as glycolic acid, lactic acid, malic acid, tartaric acid, or citric acid), camphor, ceramides, polyphenols (such as flavonoids, phenolic acid, ellagic acid, tocopherol, ubiquinol), hydroquinone, hyaluronic acid, isopropyl isostearate, isopropyl palmitate, oxybenzone, panthenol, proline, retinol, retinyl palmitate, salicylic acid, sorbic acid, sorbitol, triclosan, tyrosine;

a disinfecting agent, an antibacterial agent, an anti-UV agent, intended for paints and coatings;

a fertiliser, a herbicide, an insecticide, a pesticide, a fungicide, a repellent, or a disinfecting agent intended for agrochemical products;

a fire resistant agent, also known as a flame retarding agent, (for example a brominated polyol such as tetrabromobisphenol A, a halogenated or non-halogenated organophosphorus compound, a chlorinated compound, an aluminum trihydrate, an antimony oxide, a zinc borate, a red phosphorus, a melamine, or a magnesium dihydroxide) intended for use in plastic materials, coatings, paints, and textiles;

a photonic crystal or a photochromophore intended for use in paints, coatings, and in polymer materials that form curved and flexible screens;

a product known to the person skilled in the art under the accepted nomenclature Phase Change Materials (PCMs) that is capable of absorbing or releasing so-called 'latent' heat when going through a change in a phase, intended for the storage of energy. Examples of PCMs and the applications thereof are described in "A review on phase change energy storage: materials and applications", Farid et al., Energy Conversion and Management, 2004, 45(9-10), 1597-1615. By way of examples of PCMs, mention may be made of molten salts of aluminum phosphate, ammonium carbonate, ammonium chloride, cesium carbonate, cesium sulfate, calcium citrate, calcium chloride, calcium hydroxide, calcium oxide, calcium phosphate, calcium saccharate, calcium sulfate, cerium phosphate, iron phosphate, lithium carbonate, lithium sulfate, magnesium chloride, magnesium sulfate, manganese chloride, manganese nitrate, manganese sulfate, potassium acetate, potassium carbonate, potassium chloride, potassium phosphate, rubidium carbonate, rubidium sulfate, disodium tetraborate, sodium acetate, sodium bicarbonate, sodium bisulfate, sodium citrate, sodium chloride, sodium hydroxide, sodium nitrate, sodium percarbonate, sodium persulfate, sodium phosphate, sodium propionate, sodium selenite, sodium silicate, sodium sulfate, sodium tellurate, sodium thiosulfate, strontium hydrophosphate, zinc acetate, zinc chloride, sodium thiosulfate, paraffinic hydrocarbon waxes, polyethylene glycols.

Composition C2

The composition C2 is intended for use in forming the future solid enveloping shell of the microcapsules.

Preferably, the viscosity of the composition C2 at 25° C. is comprised between 1000 mPa·s and 50,000 mPa·s, preferably between 2000 mPa·s and 25,000 mPa·s, and for example between 3000 mPa·s and 15,000 mPa·s.

Preferably, the viscosity of the composition C2 is greater than the viscosity of the composition C1.

The viscosity is measured by means of a rheometer, model Haake Rheostress™ 600 equipped with a cone having 60 mm diameter and 2 degrees cone angle, and a temperature control cell set at 25° C. The value of the viscosity is read for a shear rate equal to 10 s$^{-1}$.

Preferably, the interfacial tension between the compositions C1 and C2 is low. Typically, these interfacial tensions vary between 0 mN/m and 50 mN/m, preferably between 0 mN/m and 20 mN/m.

The low interfacial tension between the compositions C1 and C2 also advantageously makes it possible to ensure the stability of the emulsion (E1) obtained at the conclusion of step a).

The composition C2 contains at least one monomer or polymer having an average molecular weight of less than 5000 g mol$^{-1}$, at least one crosslinking agent having an average molecular weight of less than 5000 g mol$^{-1}$, and optionally at least one photoinitiator having an average molecular weight of less than 5,000 g mol$^{-1}$, or crosslinking catalyst having an average molecular weight of less than 5,000 g mol$^{-1}$, thereby making it crosslinkable.

The importance of the selection of monomers, polymers and crosslinking agents is crucial, since these components will dictate the retention properties of the future rigid enveloping shell of the capsules. In particular, this selection is important in that it makes it possible to obtain capsules whose rigid enveloping shell contains pores that are less than 1 nm in size.

The rigid enveloping shell of the capsules is thus formed of a polymer material obtained as a result of the crosslinking of the composition C2. The dense molecular network thus formed, however, has interstices (or narrow gaps) creating a hypothetical passage between the interior and the exterior of the capsules. These interstices constitute the pores of the rigid enveloping shell. According to the invention, the pores have a size preferably of less than 5 nm, preferentially less than 1 nm, or indeed even less than 0.5 nm.

In the context of the present invention, the term "size" refers to the diameter, in particular the average diameter, of the pores.

The size of the pores may be measured for example by means of surface area analysis in accordance with the technique referred to as BET (Brunauer-Emmet-Teller) method well known to the person skilled in the art. This technique, described in more detail in "The Journal of the American Chemical Society" of Feb. 1938, Volume 60, page 309, consists in measuring the adsorption of nitrogen (gas) by the sample whose pore size is to be measured. Thus measurement is taken of the pressure of the reference cell in which the adsorbate is at its saturation vapour pressure and the pressure of the cell of the sample in which known volumes of adsorbate are injected. The curve resulting from these measurements is the adsorption isotherm. A mathematical model makes it possible to deduce therefrom the specific surface area of the capsules, and consequently thereafter the size of pores.

According to the invention, the term "monomer" or "polymer" refers to any base unit that is suitable for the formation of a solid material by polymerisation, either alone or in combination with other monomers or polymers. The term "polymer" also includes oligomers.

These monomers may be selected from among monomers comprising at least one reactive functional group selected from among the group constituted of the functions: acrylate, methacrylate, vinyl ether, N-vinyl ether, mercaptoester, thiolene, siloxane, epoxy, oxetane, urethane, isocyanate, and peroxide.

In particular, the monomers may be selected from among monomers bearing at least one of the aforementioned reactive functional groups and in addition bearing at least one functional group selected from among the group constituted of primary-, secondary- and tertiary alkylamine functional groups, quaternary amine functional groups, sulfate-, sulfonate-, phoshate-, phosphonate-, carboxylate-, hydroxyl-, halogen functional groups, and mixtures thereof.

The polymers used in the composition C2 may be selected from among polyethers, polyesters, polyurethanes, polyureas, polyethylene glycols, polypropylene glycols, polyamides, polyacetals, polyimides, polyolefins, polysulphides and polydimethylsiloxanes, the said polymers in addition bearing at least one reactive functional group selected from among the group constituted of the functions: acrylate, methacrylate, vinyl ether, N-vinyl ether, mercaptoester, thiolene, siloxane, epoxy, oxetane, urethane, isocyanate, and peroxide.

Mention of examples of such polymers include, but are not limited to, the following polymers: poly (2-(1-naphthyloxy) ethyl acrylate), poly(2-(2-naphthyloxy) ethyl acrylate), poly(2-(2-naphthyloxy) ethyl methacrylate), polysorbitol dimethacrylate, polyacrylamide, poly((2-(1-naphthyloxy) ethanol), poly(2-(2-naphthyloxy) ethanol), poly(1-chloro-2,3-epoxypropane), poly(n-butyl isocyanate), poly(N-vinyl carbazole), poly(N-vinyl pyrrolidone), poly(p-benzamide), poly(p-chlorostyrene), poly(p-methyl styrene) poly(p-phenylene oxide), poly(p-phenylene sulfide), poly(N-(methacryloxyethyl) succinimide), polybenzimidazole, polybutadiene, polybutylene terephthalate, polychloral, polychloro trifluoro ethylene, polyether imide, polyether ketone, polyether sulfone, polyhydridosilsesquioxane, poly (m-phenylene isophthalamide), poly(methyl 2-acrylamido-2-methoxyacetate), poly(2-acrylamido-2-methylpropane-sulfonic acid), poly-mono-butyl maleate, polybutyl methacrylate, poly(N-tert-butylmethacrylamide), poly(N-n-butylmethacrylamide), polycyclohexylmethacrylamide, poly(m-xylenebisacrylamide 2,3-dimethyl-1,3-butadiene, N,N-dimethylmethacrylamide), poly(n-butyl methacrylate), poly(cyclohexyl methacrylate), polyisobutyl methacrylate, poly(4-cyclohexylstyrene), polycyclol acrylate, polycyclol methacrylate, polydiethyl ethoxymethylenemalonate, poly (2,2,2-trifluoroethyl methacrylate), poly(1,1,1-trimethylolpropane trimethacrylate), polymethacrylate, poly(N,N-dimethylaniline dihydrazide), poly(isophthalic dihydrazine), isophthalic polyacid, polydimethyl benzilketal, epichlorohydrin, poly(ethyl-3,3-diethoxyacrylate), poly(ethyl-3,3-dimethylacrylate), poly(ethyl vinyl ketone), poly(vinyl ethylketone), poly(penten-3-one), polyformaldehyde, poly (diallyl acetal), polyfumaronitrile, polyglyceryl propoxy triacrylate, polyglyceryl trimethacrylate, polyglycidoxypropyltrimethoxysilane, polyglycidyl acrylate, poly(n-heptyl acrylate), poly(acrylic acid n-heptyl ester), poly(n-heptyl methacrylate), poly(3-hydroxypropionitrile), poly(2-hydroxypropyl acrylate), poly(2-hydroxypropyl methacrylate), poly(N-(methacryloxyethyl)phthalimide), poly(1,9-nonanediol diacrylate), poly(1,9-nonanediol dimethacrylate), poly (N-(n-propyl) acrylamide), poly(ortho-phthalic acid), poly (iso-phthalic acid), poly(1,4-benzenedicarboxylic acid), poly(1,3-benzenedicarboxylic acid), poly(phthalic acid), poly(mono-2-acryloxyethyl ester), terephthalic polyacid, phthalic polyanhydride, polyethylene glycol diacrylate, polyethylene glycol methacrylate, polyethylene glycol dimethacrylate, poly(isopropyl acrylate), polysorbitol pentaacrylate, polyvinyl bromoacetate, polychloroprene, poly (di-n-hexyl silylene), poly(di-n-propyl siloxane), polydimethyl silylene, polydiphenyl siloxane, polyvinyl propionate, polyvinyl triacetoxysilane, polyvinyl tris-tert-butoxysilane, polyvinyl butyral, polyvinyl alcohol, polyvinyl acetate, polyethylene co-vinyl acetate, poly(bisphenol-A polysulfone), poly(1,3-dioxepane), poly(1,3-dioxolane), poly(1,4-phenylene vinylene), poly(2,6-dimethyl-1A-phenylene oxide), poly(4-hydroxybenzoic acid), poly(4-methyl pentene-1), poly(4-vinylpyridine), polymethylacrylonitrile, polymethylphenylsiloxane, polymethylsilmethylene, polymethylsilsesquioxane, poly(phenylsilsesquioxane) poly (pyromellitimide-1,4-diphenyl ether), polytetrahydrofuran, polythiophene, poly(trimethylene oxide), polyacrylonitrile, polyether sulfone, polyethylene-co-vinyl acetate, poly(perfluoroethylene propylene), poly(perfluoroalkoxy alkane), or poly(styrene) acrylonitrile).

The term "crosslinking agent" is used to refer to a compound bearing at least two reactive functional groups that are capable of crosslinking a monomer or a polymer, or a mixture of monomers or polymers, during its polymerisation.

The crosslinking agent may be selected from among molecules bearing at least two functional groups selected from among the group constituted of the functions: acrylate, methacrylate, vinyl ether, N-vinyl ether, mercaptoester, thiolene, siloxane, epoxy, oxetane, urethane, isocyanate, and peroxide.

By way of crosslinking agent, mention may be made in particular of:

diacrylates, such as 1,6-hexanediol diacrylate, 1,6-hexanediol dimethacrylate, polyethylene glycol dimethacrylate, 1,9-nonanediol dimethacrylate, 1,4-butanediol dimethacrylate, 2,2-bis(4-methacryloxyphenyl) propane, 1,3-butanediol dimethacrylate, 1,10-decanediol dimethacrylate, bis(2-methacryloxyethyl) N,N'-1,9-nonylene biscarbamate, 1,4-butanediol diacrylate, ethylene glycol diacrylate, 1,5-pentanediol dimethacrylate, 1,4-phenylene diacrylate, allyl methacrylate, N,N'-methylenebisacrylamide, 2,2-bis[4-(2-hydroxy-3-methacryloxypropoxy) phenyl]propane, tetraethylene glycol diacrylate, ethylene glycol dimethacrylate, diethylene glycol diacrylate, triethylene glycol diacrylate, triethylene glycol dimethacrylate, polyethylene glycol diglycidyl ether, N,N-diallylacrylamide, 2,2-bis[4-(2-acryloxyethoxy) phenyl]propane, glycidyl methacrylate;

multifunctional acrylates such as dipentaerythritol pentaacrylate, 1,1,1-trimethylolpropane triacrylate, 1,1,1-trimethylolpropane trimethacrylate, ethylenediamine tetramethacrylate, pentaerythritol triacrylate, pentaerythritol tetraacrylate;

acrylates also having other reactive functional groups, such as propargyl methacrylate, 2-cyanoethyl acrylate, tricyclodecane dimethanol diacrylate, hydroxypropyl methacrylate, N-acryloxysuccinimide, N-(2-hydroxypropyl) methacrylamide, N-(3 aminopropyl)methacrylamide hydrochloride, N-(t-BOC-aminopropyl)methacrylamide, 2-aminoethyl methacrylate hydrochloride, monoacryloxyethyl phosphate, o-nitrobenzyl methacrylate, acrylic anhydride, 2-(tert-butylamino)ethyl methacrylate N,N-diallylacrylamide, glycidyl methacrylate, 2-hydroxyethyl acrylate, 4-(2-acryloxyaheoxy)-2-hydroxybenzophenone, N-(Phthalimidomethyl)acrylamide, cinnamyl methacrylate.

The term "photoinitiator" is used to refer to a compound that is capable of fragmenting under the effect of light radiation.

The photoinitiators which may be used according to the present invention are known in the state of the art and are described, for example in "Les photoinitiateurs dans la réticulation des revêtements [Photoinitiators in the crosslinking of coatings]", G. Li Bassi, Double Liaison-Chimie des Peintures [Double Bond-Chemistry of Paints], no 361, November 1985, p. 34-41; "Applications industrielles de la polymérisation photoinduite [Industrial applications of photoinduced polymerisation]", Henri Strub, L'Actualité Chimique [Chemical News], February 2000, p. 5-13; and "Photopolymères: considérations théoriques et réaction de prise [Photopolymers: theoretical considerations and setting reaction", Marc, J M Abadie, Double Liaison-Chimie des Peintures [Double Bond-Chemistry of Paints], no 435-436, 1992, p. 28-34.

These photoinitiators include:

α-hydroxyketones, such as 2-hydroxy-2-methyl-1-phenyl-1-propanone, marketed for example under the trade names DAROCUR® 1173 and 4265, IRGACURE® 184, 2959, and 500, by the company BASF, and ADDITOL® CPK by the company CYTEC;

α-amino ketones, in particular 2-benzyl-2-dimethylamino-1-(4-morpholinophenyl)-butanone-1, marketed, for example, under the trade names IRGACURE® 907 and 369 by the company BASF;

aromatic ketones marketed for example under the trade name ESACURE® TZT by LAMBERTI; or even thioxanthones marketed for example under the trade name ESACURE® ITX by LAMBERTI, and quinones. These aromatic ketones most often require the presence of a hydrogen donor compound such as tertiary amines and in particular alkanolamines. In particular mention may be made of the tertiary amine ESACURE® EDB marketed by the company LAMBERTI.

α-dicarbonyl derivatives of which the most common representative is benzyldimethylketal marketed under the trade name IRGACURE® 651 by the company BASF. Other commercially available products are marketed by the company LAMBERTI under the trade name ESACURE® KB1, and acylphosphine oxides, such as, for example, bis-acylphosphine oxides (BAPO) marketed for example under the trade names IRGACURE® 819, 1700, and 1800, DAROCUR® 4265, LUCIRIN® TPO, and LUCIRIN® TPO-L by the company BASF.

Among the photoinitiators, mention may also be made of aromatic ketones such as benzophenone, phenylglyoxylates, such as the methyl ester of phenylglyoxylic acid, oxime esters, such as [1-(4-phenylsulfanylbenzoyl)heptylideneamino]benzoate, sulphonium salts, iodonium salts and oxime sulphonates.

According to one embodiment, the composition C2 may further comprise an additional monomer or polymer capable of improving the properties of the enveloping shell of the microcapsules and/or of contributing new properties to the enveloping shell of the microcapsules.

Among these additional monomers or polymers, mention may be made of monomers or polymers bearing a group that is sensitive to pH, temperature, UV or IR.

These additional monomers or polymers are able to induce the rupture of the solid microcapsules and as a result the subsequent release of their contents, after stimulation via pH, temperature, UV or IR.

These additional monomers or polymers may be selected from among monomers or polymers bearing at least one reactive functional group selected from among the group constituted of the functions: acrylate, methacrylate, vinyl ether, N-vinyl ether, mercaptoester, thiolene, siloxane, epoxy, oxetane, urethane, isocyanate and peroxide, and also bearing one of the following groups:

a hydrophobic group such as a fluorinated group, for example trifluoroethyl methacrylate, trifluoroethyl acrylate, tetrafluoropropyl methacrylate, pentafluoropropyl acrylate, hexafluorobutyl acrylate, or fluorophenyl isocyanate;

a pH sensitive group such as primary, secondary or tertiary amines, carboxylic acids, phosphate groups, sulfate groups, nitrate groups, or carbonate groups;

a UV-sensitive or UV-cleavable group (or photochromic group) such as azobenzene, spiropyran, 2-diazo-1,2-naphthoquinone, o-nitrobenzyl, thiol, or 6-nitro-veratroyloxycarbonyl, for example poly(ethylene oxide)-block-poly(2-nitrobenzylmethacrylate), and other block copolymers, as described in particular in Liu et al., *Polymer Chemistry* 2013, 4, 3431-3443;

an IR-sensitive or IR-cleavable group such as o-nitrobenzyl or 2-diazo-1,2-naphthoquinone, for example the polymers described in Liu et al., *Polymer Chemistry* 2013, 4, 3431-3443; and a temperature sensitive group such as poly(N-isopropylacrylamide).

According to the invention, the average molecular weight of the monomers or polymers of the composition C2 is less than 5000 g.mol$^{-1}$. Preferably, this average molecular weight is comprised between 50 g.mol$^{-1}$ and 3000 g.mol$^{-1}$, preferentially between 100 g.mol$^{-1}$ and 2000 g.mol$^{-1}$.

According to the invention, the average molecular weight of the crosslinking agent (or crosslinking agents) of the composition C2 is less than 5000 g.mol$^{-1}$. Preferably, this average molecular weight is comprised between 50 g.mol$^{-1}$ and 2000 g.mol$^{-1}$, preferentially between 50 g.mol$^{-1}$ and 1000 g.mol$^{-1}$.

According to the invention, the average molecular weight of the crosslinking catalyst or initiator of the composition C2 is less than 5000 g.mol$^{-1}$. Preferably, this average molecular weight is comprised between 50 g.mol$^{-1}$ and 3000 g.mol$^{-1}$, preferentially between 100 g.mol$^{-1}$ and 2000 g.mol$^{-1}$.

The use in implementation of such constituents makes it possible to obtain a shorter distance between the crosslinking points in the material of the enveloping shell of the capsules of the invention.

Thus, according to one embodiment, the composition C2 comprises only molecules having an average molecular weight of less than 5000 g.mol$^{-1}$. If the composition C2 comprises a molecule other than the monomers or polymers, crosslinking agents or crosslinking catalyst or initiator mentioned here above, this molecule has an average molecular weight of less than 5000 g.mol$^{-1}$.

According to one embodiment, the volume fraction of C1 in C2 is comprised between 0.1 and 0.5.

This choice of the volume fraction of C1 in C2 makes it possible, in an advantageous manner, to control the thickness of the enveloping shell of the capsules obtained at the conclusion of the method thus ensuring it is between 0.2 μm and 8 μm depending on the size of the capsules (themselves being between 1 μm and 30 μm).

According to one embodiment, the composition C2 comprises from 5% to 30% by weight of crosslinking agent(s) in relation to the total weight of the said composition. Preferably, the composition C2 comprises from 5% to 20%, and preferentially from 5% to 15%, by weight of crosslinking agent(s) in relation to the total weight of the said composition.

According to one embodiment, the ratio of the number of moles of reactive functional groups of the monomers or polymers (or oligomers) contained in C2 in relation to the number of moles of monomers or polymers (or oligomers) contained in C2 is greater than 1.5, preferably comprised between 1.7 and 3.

This embodiment is advantageous in that it provides the ability to obtain a greater number of crosslinking points in the material of the enveloping shell of the capsules.

According to the invention, the term "reactive functional group" (or reactive function) is used to refer to an atom or a group of atoms present in the monomer or polymer and capable of creating a covalent chemical bond with another molecule included in C2. Among these functional groups mention may be made, for example, of the functions: acrylate, methacrylate, vinyl ether, N-vinyl ether, mercaptoester, thiolene, siloxane, epoxy, oxetane, urethane, isocyanate, and peroxide.

According to the invention, the term "molecules contained in C2" is used to refer to all the molecules contained in the abovementioned composition C2, and therefore in particular the abovementioned monomers or polymers, crosslinking agents, and initiators or catalysts.

According to one embodiment, the composition C2 does not comprise molecules other than the monomers or polymers, crosslinking agents, and initiators or catalysts mentioned here above. Thus, preferably, the molecules contained in the composition C2 are constituted of the monomers or polymers, crosslinking agents, and initiators or catalysts mentioned here above.

According to one embodiment, the composition C2 comprises a polymer, a crosslinking agent and a (photo)initiator.

In the context of the present invention, the "number of moles of reactive functional groups of the monomers or polymers contained in C2 in relation to the number of moles of monomers or polymers contained in C2" can be effectively derived by counting the number of moles of reactive functional groups of monomers or polymers contained in C2 divided by the number of moles of monomers or polymers contained in C2. This ratio reflects the capacity and ability of the components of C2 to create a molecular network that contains numerous junction points between molecules.

According to one embodiment, the composition C2 contains less than 5% by weight of molecules having no reactive functional group, preferably between 0.01% and 4%, preferentially between 0.01% and 3%.

This embodiment is advantageous in that it provides the ability to obtain a greater number of crosslinking points in the material of the enveloping shell of the capsules.

In effect, a "molecule having no reactive functional group" is not able to be bound to any other molecule comprised in C2. A molecule having one single reactive functional group can be bound to only one other molecule comprised in C2, whereas a molecule having two reactive functional groups can be bound to two other molecules, and so on as the number of reactive functional groups increases.

According to one embodiment, the composition C2 comprises from 65% to 95% by weight of monomer or polymer, or a mixture of monomers or polymers, and from 5% to 30% by weight of crosslinking agent(s) in relation to the total weight of the composition C2.

According to one embodiment, the composition C2 comprises from 0.1% to 5% by weight of photoinitiator or a mixture of photoinitiators, in relation to the total weight of the composition C2.

Step b)

The step b) of the method according to the invention consists in preparing a second emulsion (E2).

The second emulsion consists of a dispersion of droplets of the first emulsion in a composition C3 that is immiscible with C2, created by addition dropwise of the emulsion (E1) into C3 under agitation.

During the step b), the emulsion (E1) is at a temperature comprised between 15° C. and 60° C. During the step b), the composition C3 is at a temperature comprised between 15° C. and 60° C.

Under the addition conditions of step b), the compositions C2 and C3 are not miscible with each other, which signifies that the amount (by weight) of the composition C2 capable of being solubilised in the composition C3 is less than or equal to 5%, preferably less than 1%, and preferentially less than 0.5%, in relation to the total weight of the composition C3, and that the amount (by weight) of the composition C3 capable of being solubilised in the composition C2 is less than or equal to 5%, preferably less than 1%, and preferentially less than 0.5%, in relation to the total weight of the composition C2.

Thus, when the emulsion (E1) comes into contact with the composition C3 under agitation, the latter is dispersed in the form of droplets, referred to as double droplets, the dispersion of these droplets of emulsion (E1) in the continuous phase C3 being referred to as emulsion (E2).

Typically, a double droplet formed during the step b) corresponds to a single droplet of the composition C1 as described here above, encased by an enveloping shell of composition C2 which completely encapsulates the said single droplet.

The double droplet formed during the step b) may also comprise at least two single droplets of the composition C1, the said single droplets being encased by an enveloping shell of composition C2 which completely encapsulates the said single droplets.

Thus, the said double droplets comprise a core constituted of one or more single droplets of the composition C1, and a layer of the composition C2 encasing the said core.

The resulting emulsion (E2) is generally a polydisperse double emulsion (C1-in-C2-in-C3 emulsion or C1/C2/C3 emulsion), which signifies that the double droplets do not have a clear size distribution in the emulsion (E2).

The immiscibility between the compositions C2 and C3 provides the ability to prevent mixing between the layer of the composition C2 and the composition C3 and thus ensures the stability of the emulsion (E2).

The immiscibility between the compositions C2 and C3 also provides the ability to prevent the water-soluble substance of the composition C1 from migrating from the core of the droplets to the composition C3.

In order to implement the step b), use may be made of any type of agitator usually used to form emulsions, such as, for example, a mechanical agitator with paddles, a static emulsifier, an ultrasonic homogeniser, a membrane homogeniser, a high pressure homogeniser, a colloid mill, a high shear disperser or a high speed homogeniser.

Composition C3

According to one embodiment, the viscosity of the composition C3 at 25° C. is greater than the viscosity of the emulsion (E1) at 25° C.

According to the invention, the viscosity of the composition C3 at 25° C. is comprised between 500 mPa·s and 100,000 mPa·s.

Preferably, the viscosity of the composition C3 at 25° C. is comprised between 3,000 mPa·s and 100,000 mPa·s, preferentially between 5,000 mPa·s and 80,000 mPa·s, for example between 7,000 mPa·s and 70,000 mPa·s.

According to this embodiment, given the very high viscosity of the continuous phase formed by the composition C3, the rate of destabilisation of the double droplets of the emulsion (E2) is significantly slow in relation to the duration of the method of the invention, which thus then provides for kinetic stabilisation of the emulsions (E2) and then (E3) until such time as the polymerisation of the enveloping shell of the capsules is completed. The capsules once polymerised are thermodynamically stable.

Thus, the very high viscosity of the composition C3 ensures the stability of the emulsion (E2) obtained at the conclusion of step b).

A low surface tension between C3 and the first emulsion as well as a high viscosity of the system make it possible to advantageously ensure the kinetic stability of the double emulsion (E2), thus preventing it from undergoing phase separation (dephasing) over the duration of the manufacturing method.

Preferably, the interfacial tension between the compositions C2 and C3 is low. The low interfacial tension between the compositions C2 and C3 also advantageously makes it possible to ensure the stability of the emulsion (E2) obtained at the conclusion of the step b).

The volume fraction of the first emulsion in C3 can be varied from 0.05 to 0.5 in order, on the one hand, to improve the production yield and, on the other hand, to cause to vary the mean diameter of the capsules. At the end of this step, the size distribution of the second emulsion is relatively wide.

According to one embodiment, the ratio between the volume of emulsion (E1) and the volume of composition C3 varies between 1:10 and 10:1. Preferably, this ratio is comprised between 1:9 and 3:1, preferentially between 1:9 and 1:1.

According to one embodiment, the composition C3 comprises in addition at least one branched polymer, preferably having a molecular weight greater than 5000 g.mol$^{-1}$, and/or at least one polymer having a molecular weight greater than 5000 g.mol$^{-1}$, and/or solid particles such as silicates.

According to one embodiment, the composition C3 comprises at least one branched polymer, preferably having a molecular weight greater than 5000 g.mol$^{-1}$, preferentially between 10,000 g.mol$^{-1}$ and 500,000 g.mol$^{-1}$, for example between 50,000 g.mol$^{-1}$ and 300,000 g.mol$^{-1}$.

The term "branched polymer" is used to refer to a polymer having at least one branch point between its two end groups, a branch point being a point of a chain on which is attached a side chain also referred to as branch or pendant chain.

Among the branched polymers, mention may be made for example of graft polymers, comb polymers, or indeed star polymers or dendrimers.

According to one embodiment, the composition C3 comprises at least one polymer having a molecular weight greater than 5000 g mol$^{-1}$, preferentially between 10,000 g.mol$^{-1}$ and 500,000 g.mol$^{-1}$, for example between 50,000 g.mol$^{-1}$ and 300,000 g.mol$^{-1}$.

By way of a polymer that may be used in the composition C3, mention may be made of the following compounds, used alone or indeed mixed together:

- cellulose derivatives, such as cellulose ethers: methyl cellulose, ethyl cellulose, hydroxyethyl cellulose, methylhydroxyethyl cellulose, ethylhydroxyethyl cellulose, carboxymethyl cellulose, hydroxypropyl cellulose, or methylhydroxypropyl cellulose;
- polyacrylates (also known as carbomers), such as polyacrylic acid (PAA), polymethacrylic acid (PMAA), poly(hydroxyethyl methacrylate) (pHEMA), poly(N-2-hydroxypropyl methacrylate) (pHPMA);
- polyacrylamides such as poly(N-isopropylacrylamide) (PNIPAM);
- polyvinylpyrrolidone (PVP) and the derivatives thereof;
- polyvinyl alcohol (PVA) and the derivatives thereof;
- poly(ethylene glycol), poly(propylene glycol) and the derivatives thereof, such as poly(ethylene glycol) acrylate/methacrylate, poly(ethylene glycol) diacrylate/dimethacrylate, polypropylene carbonate;
- polysaccharides such as carrageenans, carob gums or tara gums, dextran, xanthan gums, chitosan, agarose, hyaluronic acids, gellan gum, guar gum, arabic gum, tragacanth gum, diuretic gum, oat gum, karaya gum, ghatti gum, curdlan gum, pectin, konjac gum, starch;
- protein derivatives such as gelatin, collagen, fibrin, polylysine, albumin, casein;
- silicone derivatives such as polydimethylsiloxane (also known as dimethicone), alkyl silicones, aryl silicones, alkyl aryl silicones, polyethylene glycol dimethicones, polypropylene glycol dimethicone;
- waxes, such as diester waxes (alkanediol diesters, hydroxyl acid diesters), triester waxes (triacylglycerols; triesters of alkane-1,2-diol, ω-hydroxy acid and fatty acid; esters of hydroxymalonic acid, fatty acid and alcohol; triesters of hydroxyl acids, fatty acid and fatty alcohol, triesters of fatty acid, hydroxyl acid and diol) and polyester waxes (polyesters of fatty acids). The fatty acid esters which may be used by way of waxes in the context of the invention are, for example, cetyl palmitate, cetyl octanoate, cetyl laurate, cetyl lactate, cetyl isononanoate, and cetyl stearate., stearyl stearate, myristyl stearate, cetyl myristate, isocetyl stearate, glyceryl trimyristate, glyceryl tripalmitate, glyceryl monostearate, or glyceryl palmitate and cetyl palmitate;
- fatty acids which may be used as waxes such as cerotic acid, palmitic acid, stearic acid, dihydroxystearic acid, behenic acid, lignoceric acid, arachidic acid, myristic acid, lauric acid, tridecyclic acid, pentadecyclic acid, margaric acid, nonadecyclic acid, henicosylic acid, tricosylic acid, pentacosylic acid, heptacosylic acid, montanic acid or nonacosylic acid;
- fatty acid salts, in particular fatty acid aluminum salts such as aluminum stearate, hydroxyl aluminum bis(2-ethylhexanoate);
- isomerised jojoba oil;
- hydrogenated sunflower oil;
- hydrogenated coconut oil;
- hydrogenated lanolin oil;
- castor oil and the derivatives thereof, in particular modified hydrogenated castor oil or compounds obtained by esterification of castor oil with fatty alcohols;
- polyurethanes and the derivatives thereof;
- styrenic polymers such as styrene butadiene;
- polyolefins such as polyisobutene;

According to one embodiment, the composition C3 comprises solid particles such as clays, silicas and silicates.

By way of solid particles that may be used in the composition C3, mention may be made of clays and silicates belonging in particular to the category of phyllosilicates (also known as layered silicates). By way of example of a silicate that may be used in the context of the invention, mention may be made of Bentonite, Hectorite, Attapulgite, Sepiolite, Montmorillonite, Saponite, Sauconite, Nontronite, Kaolinite, Talc, Sepiolite, Chalk. The fumed synthetic silicas may also be used. The clays, silicates and silicas previously mentioned above can advantageously be modified by organic molecules such as polyethers, ethoxylated amides, quaternary ammonium salts, long-chain diamines, long-chain esters, polyethylene glycols, polypropylene glycols.

These particles may be used either alone or mixed together.

According to one embodiment, the composition C3 comprises at least one polymer having a molecular weight greater than 5000 g.mol$^{-1}$ and solid particles. Any mixture of the compounds previously mentioned above may be used.

Step c)

The step c) of the method according to the invention consists in refining the size of the droplets of the second emulsion (E2).

This step may consist in applying a homogeneous controlled shear to the emulsion (E2), with the said shear rate applied comprised between 10 s$^{-1}$ and 100,000 s$^{-1}$.

According to one embodiment, the polydisperse double droplets obtained in the step b) are subjected to a size refinement process consisting of subjecting them to shearing capable of fragmenting them into new double droplets of homogeneous and controlled diameters. Preferably, this fragmentation step is carried out by using a high-shear cell such as the Couette type cell according to a method described in the patent application EP 15 306 428.2.

According to one embodiment, in the step c), the second emulsion (E2), obtained at the conclusion of the step b), consisting of polydisperse double droplets dispersed in a continuous phase, is subjected to a shear in a mixer, which applies a homogeneous controlled shear.

Thus, according to this embodiment, the step c) consists in applying a homogeneous controlled shear to the emulsion (E2), with the said shear rate applied comprised between 1000 s$^{-1}$ and 100,000 s$^{-1}$.

According to this embodiment, in a mixer, the shear rate is said to be controlled and homogeneous, regardless of the duration of application, when it passes to a maximum value that is identical for all the parts of the emulsion, at a given time instant that may vary from one point of the emulsion to another. According to the invention, the exact configuration of the mixer is not critical as long as the entire emulsion has been subjected to the same maximum shear when exiting from this device. The mixers that are suitable for carrying out the step c) are described in particular in the document US 5938581.

The second emulsion may undergo homogeneous controlled shear when it circulates through a cell formed by:

two concentric rotary cylinders (also referred to as a Couette type mixer);

two parallel rotating discs; or two parallel oscillating plates.

According to this embodiment, the shear rate applied to the second emulsion is comprised between 1,000 s$^{-1}$ and 100,000 s$^{-1}$, preferably between 1,000 s$^{-1}$ and 50,000 s$^{-1}$, and preferentially between 2,000 s$^{-1}$ and 20,000 s$^{-1}$.

According to this embodiment, during the step c), the second emulsion is introduced into the mixer and is then subjected to shear which results in the formation of the third emulsion. The third emulsion (E3) is chemically identical to the second emulsion (E2) but consists of monodisperse double droplets while the emulsion (E2) consists of polydisperse double droplets. The third emulsion (E3) typically consists of a dispersion of double droplets comprising a core constituted of one or more droplets of the composition C1 and a layer of the composition C2 encapsulating the said core, the said double droplets being dispersed in the composition C3.

The difference between the second emulsion and the third emulsion is the size variance of the double droplets: the droplets of the second emulsion are polydisperse in size while the droplets of the third emulsion are monodisperse, thanks to the fragmentation mechanism described here above.

Preferably, according to this embodiment, the second emulsion is introduced in a continuous manner into the mixer, which signifies that the quantity of double emulsion (E2) introduced at the inlet of the mixer is the same as the quantity of third emulsion (E3) at the outlet of the mixer.

Given that the size of the droplets of the emulsion (E3) corresponds essentially to the size of the droplets of the solid microcapsules after polymerisation, it is possible to adjust the size of the microcapsules and the thickness of the enveloping shell by adjusting the shear rate during the step c), with a strong correlation between the decrease in the size of droplets and the increase in shear rate. This makes it possible to adjust the resulting dimensions of the microcapsules by varying the shear rate applied during the step c).

According to one preferred embodiment, the mixer implemented during the step c) is a Couette type mixer, comprising two concentric cylinders, one external cylinder having internal radius $R_o$, and an internal cylinder having external radius R the external cylinder being fixed and the internal cylinder being in rotation with an angular velocity $\omega$.

A Couette-type mixer that is appropriate for the method of the invention may be supplied by the company TSR France.

According to one embodiment, the angular velocity $\omega$ of the internal rotating cylinder of the Couette type mixer is greater than or equal to 30 rad.s$^{-1}$.

For example, the angular velocity $\omega$ of the internal rotating cylinder of the Couette type mixer is about 70 rad.s$^{-1}$.

The dimensions of the fixed external cylinder of the Couette type mixer may be chosen so as to modulate the space ($d=R_o-R_i$) between the rotating internal cylinder and the fixed external cylinder.

According to one embodiment, the space ($d=R_o-R_i$) between the two concentric cylinders of the Couette type mixer is comprised between 50 μm and 1000 μm, preferably between 100 μm and 500 μm, for example between 200 μm and 400 μm.

For example, the distance d between the two concentric cylinders is equal to 100 μm. According to this embodiment, during the step c), the second emulsion is introduced at the inlet of the mixer, typically via a pump, and is directed towards the space between the two concentric cylinders, the external cylinder being fixed and the internal cylinder being in rotation at an angular velocity $\omega$.

When the double emulsion is in the space between the two cylinders, the shear rate applied to the said emulsion is given by the following equation:

$$\gamma = \frac{R_i \omega}{(R_o - R_i)}$$

in which:
ω is the angular velocity of the rotating internal cylinder;
$R_o$ is the internal radius of the fixed external cylinder; and
$R_i$ is the external radius of the internal rotating cylinder.

According to another embodiment, when the viscosity of the composition C3 is greater than 2000 mPa·s at 25° C., the step c) consists in applying to the emulsion (E2) a shear rate of less than 1000 s$^{-1}$.

According to this embodiment, the fragmentation step c) may be carried out by making use of any type of mixer usually used to form emulsions with a shear rate of less than 1000 s$^{-1}$, in which case the viscosity of the composition C3 is greater than 2000 mPa·s, that is to say, under conditions such as those described in the patent application FR 16 61787.

The geometric characteristics of the double droplets formed at the end of this step will dictate those of the future capsules.

According to this embodiment, in the step c), the emulsion (E2), constituted of polydisperse droplets dispersed in a continuous phase, is subjected to shear, for example in a mixer, at a low shear rate, that is to say less than 1000 s$^{-1}$.

According to this embodiment, the shear rate applied in the step c) is for example comprised between 10 s$^{-1}$ and 1000 s$^{-1}$.

Preferably, the shear rate applied in the step c) is strictly less than 1000 s$^{-1}$.

According to this embodiment, the droplets of emulsion (E2) can be efficiently fragmented into fine and monodisperse droplets of emulsion (E3) only if a high shear stress is applied thereto.

The shear stress a applied to a droplet of emulsion (E2) is defined as the tangential force per unit surface area of droplet resulting from the macroscopic shear applied to the emulsion during agitation thereof during the step d).

The shear stress σ (expressed in Pa), the viscosity of the composition C3 η (expressed in Pa s) and the shear rate γ (expressed in s$^{-1}$) applied to the emulsion (E2) during agitation thereof during the course of step d) are linked by the following equation:

$$\sigma = \eta \gamma$$

Thus, according to this embodiment, the high viscosity of the composition C3 makes it possible to apply a very high shear stress to the droplets of emulsion (E2) in the mixer, even if the shear rate is low and the shear inhomogeneous.

In order to implement the step c) according to this embodiment, use may be made of any type of agitator usually used to form emulsions, such as, for example, a mechanical agitator with paddles, a static emulsifier, an ultrasonic homogeniser, a membrane homogeniser, a high pressure homogeniser, a colloid mill, a high shear disperser or a high speed homogeniser.

According to one preferred embodiment, use is made of a simple emulsifier such as a mechanical paddle agitator or a static emulsifier in order to implement the step c). Indeed, this is possible because this embodiment requires neither controlled shear nor shear force greater than 1000 s$^{-1}$.

Step d)

The step d) of the method of the invention consists of the crosslinking and therefore the formation of the enveloping shell of the solid microcapsules according to the invention.

This step makes it possible both to achieve the expected retention performance of the capsules and to ensure the thermodynamic stability thereof, thereby definitively preventing any destabilisation mechanism such as coalescence or curing.

According to one embodiment, when the composition C2 comprises a photoinitiator, the step d) is a step of photopolymerisation consisting in exposing the emulsion (E3) to a light source that is capable of initiating the photopolymerisation of the composition C2, in particular to a UV light source emitting preferably in the wavelength range of between 100 nm and 400 nm, and this being in particular for a time period of less than 15 minutes.

According to this embodiment, the step d) consists in subjecting the emulsion (E3) to photopolymerisation, which will thus enable the photopolymerisation of the composition C2. This step will provide the ability to obtain microcapsules that encapsulate the water-soluble substance as defined here above.

According to one embodiment, the step d) consists in exposing the emulsion (E3) to a light source capable of initiating the photopolymerisation of the composition C2.

Preferably, the light source is a source of UV light.

According to one embodiment, the UV light source emits in the wavelength range of between 100 nm and 400 nm.

According to one embodiment, the emulsion (E3) is exposed to a light source for a period less than 15 minutes, and preferably for 5 to 10 minutes.

During the step d), the enveloping shell of the aforementioned double droplets, constituted of the photocrosslinkable composition C2, is cross-linked and thus converted into a viscoelastic polymeric enveloping shell, that encapsulates and protects the water-soluble substance from being released in the absence of a mechanically triggered mechanism.

According to one other embodiment, when the composition C2 does not comprise a photoinitiator, the step d) is a polymerisation step, without exposure to a light source, with the duration of this step d) of polymerisation preferably being comprised between 8 hours and 100 hours and/or this step d) being carried out at a temperature comprised between 20° C. and 80° C.

According to this embodiment, the polymerisation is initiated for example by exposure to heat (thermal initiation), or simply by bringing about contact of the monomers, polymers and crosslinking agents with each other, or with a catalyst. The time of polymerisation is then generally greater than several hours.

Preferably, the step d) of polymerisation of the composition C2 is carried out for a time period of between 8 hours and 100 hours, at a temperature comprised between 20° C. and 80° C.

The composition obtained at the conclusion of step d), comprising of solid microcapsules dispersed in the composition C3, is ready for use and may be used without any additional step of post-treatment of the capsules being required.

The thickness of the enveloping shell of the microcapsules thus obtained is typically comprised between 0.2 μm and 8 μm, preferably between 0.2 μm and 5 μm.

According to one embodiment, the solid microcapsules obtained at the conclusion of step d) are free of any surfactant.

The method of the invention presents the advantage of not requiring a surfactant, in any of the steps described. The method of the invention thus makes it possible to reduce the presence of additives which could modify the properties of the final product obtained after release of the active ingredient.

The present invention also relates to a series (or set) of solid microcapsules, which it is possible to obtain in accordance with the method as defined here above, in which each microcapsule includes:

a core comprising a composition C1 as defined here above; and a solid enveloping shell that completely encapsulates at its periphery the core, the said solid enveloping shell comprising pores that are less than 1 nm in size;

in which the mean diameter of the said microcapsules is comprised between 1 µm and 30 µm, the thickness of the rigid enveloping shell is comprised between 0.2 µm and 8 µm, preferably between 0.2 µm and 5 µm and the standard deviation of the distribution of the diameter of microcapsules is less than 50%, in particular less than 25%, or less than 1 µm.

Preferably, the solid microcapsules obtained by the method of the invention are formed by a core containing at least one active ingredient (composition C1) and a solid enveloping shell (obtained from the composition C2) that completely encapsulates at its periphery the said core, the said solid enveloping shell comprising pores that are less than 1 nm in size.

As indicated here above, the method of the invention makes it possible to obtain monodisperse particles. Also, the series of solid microcapsules mentioned here above is made up of a population of particles that are monodisperse in size. Thus, the standard deviation of the distribution of the diameter of microcapsules is less than 50%, in particular less than 25%, or less than 1 µm.

The distribution of size of the solid microcapsules can be measured by means of the light scattering technique using a Mastersizer 3000 (Malvern Instruments) equipped with a Hydro SV measurement cell.

According to one embodiment, the aforementioned solid microcapsules comprise a solid enveloping shell entirely composed of crosslinked polymer (obtained from the composition C2) and comprising pores that are less than 1 nm in size.

As indicated here above, the method of the invention makes it possible to obtain solid microcapsules. The present invention therefore also relates to solid microcapsules comprising of a core and a solid enveloping shell that completely encapsulates at its periphery the core, wherein the core is a composition C1 as defined here above, and wherein the said solid enveloping shell is constituted of crosslinked polymer and comprises pores that are less than 1 nm in size, With the diameter of the said microcapsule being comprised between 1 µm and 30 µm and the thickness of the rigid enveloping shell being comprised between 0.2 µm and 8 µm.

The present invention also relates to a composition comprising of a series of solid microcapsules as defined here above.

The expressions "comprised between . . . and . . . ", "ranging from . . . to . . . " and "from . . . to . . . " are to be understood as inclusive of limits, unless otherwise specified.

The following examples are provided by way of illustrating the present invention without limiting the scope thereof.

EXAMPLES

Example 1: Manufacture of Solid Capsules According to the Invention

A mechanical agitator (Ika Eurostar 20) equipped with a deflocculating type propeller stirrer is used to carry out all the stirring/agitation steps.

Step a): Preparation of the First Emulsion (E1)

| | Raw Materials | % in C2 | % in E1 |
| --- | --- | --- | --- |
| Composition C1 | Paraffin Oil | | 30 |
| Composition C2 | CN 1963 (Aliphatic Urethane Acrylate Oligomer, Sartomer) | 80 | 70 |
| | SR 399 (Crosslinking Agent Dipentaerythritol Pentaacrylate, Sartomer) | 17 | |
| | Darocur 1173 (Photoinitiator, BASF) | 3 | |
| | Total | 100 | 100 |

The composition C2 according to the invention has the following characteristics:

The component CN 1963 has two reactive acrylate functional groups per molecule and an average molecular weight of less than 5000 g/mol.

The crosslinking agent SR 399 has 5 reactive acrylate functional groups per molecule and a molecular weight of 524.5 g/mol.

The photoinitiator Darocur 1173 has no reactive functional groups and its molecular weight is 164 g/mol.

The composition C1 is added dropwise to the composition C 2 under agitation at 2000 rpm with a ratio of 3:7. The first emulsion (E1) is thus obtained.

Step b): Preparation of the Second Emulsion (E2)

| | Raw Materials | % |
| --- | --- | --- |
| First Emulsion | — | 5 |
| Composition C3 | Sodium Alginate (Sigma Aldrich) | 9.5 |
| | Deionised Water | 85.5 |
| | Total | 100 |

The composition C3 is placed under agitation at 1000 rotations per minute (rpm) until complete homogenisation is obtained and then allowed to stand for a period of one hour at ambient temperature. The first emulsion (E1) is then added dropwise to the composition C3 under agitation at 1000 rpm. The second emulsion (E2) is thus obtained.

Step c): Size Refinement of the Second Emulsion

The second polydisperse emulsion (E2) obtained in the previous step is agitated at 1000 rpm for a period of 10 minutes. A monodisperse emulsion (E3) is thus obtained.

Step d): Cross-linking of the Enveloping Shell of the Capsules

The second monodisperse emulsion (E3) obtained in the previous step is irradiated for a period of 10 minutes by using a UV light source (Dymax LightBox ECE 2000) having a maximum luminous intensity of 0.1 W/cm$^2$ at a wavelength of 365 nm.

The microcapsules obtained present a good size distribution, that is to say, an average size of 5.5 µm and the size distribution thereof has a standard deviation of 2.5 µm that is 45%.

The porosity of the enveloping shell of the microcapsules according to Example 1 was studied by means of surface area analysis in accordance with the technique referred to as BET (Brunauer-Emmet-Teller) as follows. The sample of capsules is first washed in deionised water by centrifugation and redispersion and then dried at 50° C. for an overnight period. A step of activation is then carried out making use of a Smart VacPrep apparatus marketed by the company Micromeritics which applies a temperature ramp of 5° C. per minute up to 150° C. under air vacuum in order to clear the sample of any possible gas adsorption. A TriStar II Plus analyser marketed by the company Micromeritics is then used to measure the adsorption of nitrogen by the sample at a temperature of −196° C.

The results of the BET analysis show the non-adsorbance of nitrogen on the sample. Thus, the size of pores of the microcapsules according to Example 1 is less than the sensitivity limit of the apparatus, which may be conservatively estimated at 1 nm.

Comparative Example: Manufacture of Porous Solid Capsules

A mechanical agitator (Ika Eurostar 20) equipped with a deflocculating type propeller stirrer is used to carry out all the stirring/agitation steps.

Step a): Preparation of the First Emulsion (E1)

|  | Raw Materials | % in C2 | % in E1 |
|---|---|---|---|
| Composition C1 | Paraffin Oil |  | 30 |
| Composition C2 | CN 1963 (Aliphatic Urethane Acrylate Oligomer, Sartomer) | 77 |  |
|  | Darocur 1173 (Photoinitiator, BASF) | 3 | 70 |
|  | Cyclohexane (Organic Solvent with no Reactive Functional Group) | 20 |  |
|  | Total | 100 | 100 |

The composition C2 does not correspond to the invention given that it includes more than 5% by weight of molecules having no reactive functional group.

The composition C1 is added dropwise to the composition C2 under agitation at 2000 rpm with a ratio of 3:7. The first emulsion (E1) is thus obtained.

Step b): Preparation of the Second Emulsion (E2)

|  | Raw Materials | % |
|---|---|---|
| First Emulsion |  — | 5 |
| Composition C3 | Sodium Alginate (Sigma Aldrich) | 10 |
|  | Deionised Water | 85 |
|  | Total | 100 |

The composition C3 is placed under agitated at 1000 rotations per minute (rpm) until complete homogenisation is obtained and then allowed to stand for a period of one hour at ambient temperature. The first emulsion (E1) is then added dropwise to the composition C3 under agitation at 1000 rpm. The second polydisperse emulsion (E2) is thus obtained.

Step c): Cross-linking of the Enveloping Shell of the Capsules

The second polydisperse emulsion (E2) obtained in the previous step is irradiated for a period of 10 minutes by using a UV light source (Dymax LightBox ECE 2000) having a maximum luminous intensity of 0.1 W/cm² at a wavelength of 365 nm.

The microcapsules obtained present a size distribution ranging from 3 μm to 40 μm in diameter.

The porosity of the enveloping shell of the microcapsules according to this comparative example was studied by means of scanning electron microscopy. The sample of capsules is first washed in deionised water by centrifugation and redispersion and then deposited on a conductive carbon disc and dried at 60° C. for a period of 10 minutes. It is subsequently coated with gold by means of cathode sputtering under argon making use of a Sputter Coater 108 (Cressington) for a period of 10 seconds, and then imaged under vacuum by using an SEM 3030 scanning electron microscope (Hitashi).

The images obtained show porous capsules whose pores, which are clearly visible, have a mean diameter of between 500 and 1000 nm. The capsules of the comparative example therefore have low retention and protection properties as compared to the capsules according to the invention.

The invention claimed is:

1. A method for preparing solid microcapsules, the said solid microcapsules comprising a core containing at least one active ingredient and a solid enveloping shell that completely encapsulates at its periphery the said core, the said solid enveloping shell comprising pores that are less than 1 nm in size;
   said method comprising the following steps:
   a) adding, under agitation, a composition C1, comprising at least one active ingredient, in a polymeric composition C2, the compositions C1 and C2 being immiscible with each other, the volume fraction of C1 in C2 being comprised between 0.1 and 0.5;
   the composition C2 comprising at least one monomer or polymer having an average molecular weight of less than 5000 g.mol$^{-1}$, at least one crosslinking agent having an average molecular weight of less than 5000 g.mol$^{-1}$, and optionally at least one photoinitiator having an average molecular weight of less than 5000 g.mol$^{-1}$ or a crosslinking catalyst having an average molecular weight of less than 5000 g.mol$^{-1}$;
   the viscosity of the composition C2 being comprised between 500 mPa·s and 100,000 mPa·s at 25° C.,
   wherein an emulsion (E1) is obtained comprising droplets of the composition C1 dispersed in the composition C2;
   b) adding, under agitation, the emulsion (E1) in a composition C3, the compositions C2 and C3 being immiscible with each other;
   the viscosity of the composition C3 being comprised between 500 mPa·s and 100,000 mPa·s at 25° C.,
   wherein a double emulsion (E2) is obtained comprising droplets dispersed in the composition C3;
   c) applying a shear to the emulsion (E2);
   wherein a double emulsion (E3) is obtained comprising size controlled droplets dispersed in the composition C3; and
   d) polymerizing the composition C2, wherein solid microcapsules dispersed in the composition C3 are obtained.

2. The method according to claim 1, in which the composition C2 comprises from 5% to 30% by weight of crosslinking agent(s) in relation to the total weight of the said composition.

3. The method according to claim 1, in which the ratio of the number of moles of reactive functional groups of the monomers or polymers contained in C2 in relation to the number of moles of monomers or polymers contained in C2 is greater than 1.5.

4. The method according to claim 1, in which the composition C2 contains less than 5% by weight of molecules having no reactive functional group.

5. The method according to claim 1, in which step c) comprises applying a homogeneous controlled shear to the emulsion (E2), with the said shear rate applied comprised between 1000 s$^{-1}$ and 100,000 s$^{-1}$.

6. The method according to claim 1, in which, when the viscosity of the composition C3 is greater than 2000 mPa·s at 25° C., step c) comprises applying to the emulsion (E2) a shear rate of less than 1000 s$^{-1}$.

7. The method according to claim 1, in which, when the composition C2 comprises a photoinitiator, step d) is a step of photopolymerization comprising exposing the emulsion (E3) to a light source that is capable of initiating the photopolymerization of the composition C2.

8. The method according to claim 1, in which, when the composition C2 does not comprise a photoinitiator, step e) is a polymerization step, without exposure to a light source.

9. The method according to claim 1, in which the composition C3 further comprises at least one branched polymer, and/or at least one polymer having a molecular weight greater than 5000 g.mol$^{-1}$, and/or solid particles.

10. A series of solid microcapsules, in which each microcapsule includes:
   a core comprising a composition C1 as defined in claim 1; and
   a solid enveloping shell that completely encapsulates at its periphery the core, the said solid enveloping shell comprising pores that are less than 1 nm in size;
   in which the mean diameter of the said microcapsules is comprised between 1 μm and 30 μm, the thickness of the solid enveloping shell is comprised between 0.2 μm and 8 μm and the standard deviation of the distribution of the diameter of microcapsules is less than 50%, or less than 1 μm.

11. A composition comprising a series of solid microcapsules according to claim 10.

* * * * *